United States Patent Office 3,205,146
Patented Sept. 7, 1965

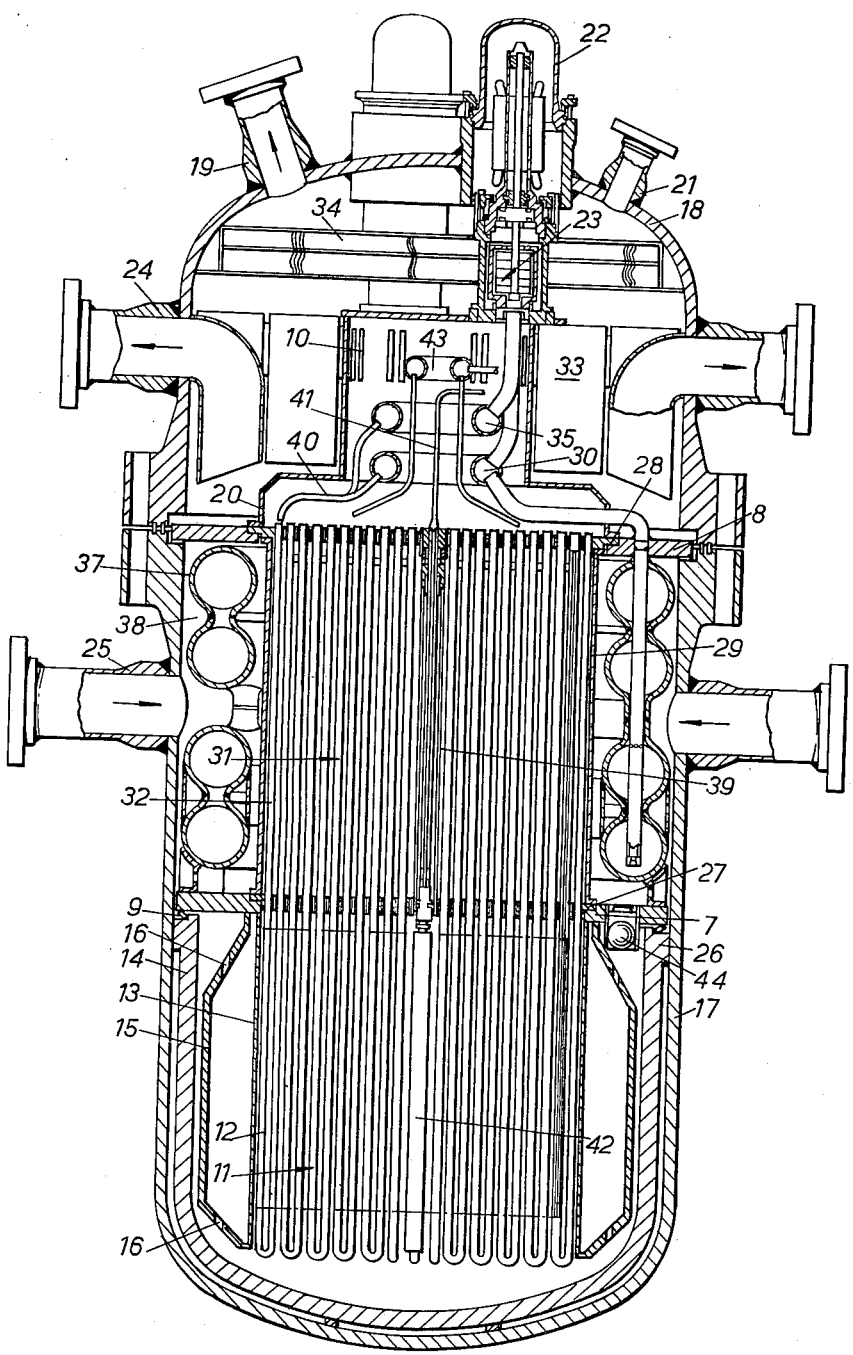

3,205,146
NUCLEAR REACTOR WITH COOLANT NON-RETURN VALVES IN PRESSURE VESSEL
Stanley Hackney, Fearnhead, near Warrington, and Ronald Peter Williams, Culcheth, Warrington, England, assignors to United Kingdom Atomic Energy Authority, London, England
Filed Nov. 19, 1962, Ser. No. 238,369
Claims priority, application Great Britain, July 5, 1962, 25,787/62
3 Claims. (Cl. 176—54)

This invention relates to nuclear reactors and more particularly to those nuclear reactors having a reactor vessel, a core within the vessel, and a baffle surrounding the core to define a flow path for a liquid reactor coolant to flow through the core.

It is desirable that a nuclear reactor should "fail safe" under any conceivable accident conditions. For a nuclear reactor of the kind to which this invention relates it is important that the core is immersed in the liquid coolant particularly during any incident in which the core becomes overheated since the heat capacity of the liquid coolant is greater than any gas or vapour which might be evolved from it.

Accordingly, the present invention provides, in one of its aspects, a nuclear reactor comprising a reactor vessel, a core within the vessel, a baffle surrounding the core defining a flow path for a liquid reactor coolant to flow through the core and through the annular passage between the baffle and the vessel, and non-return valves disposed in the annular passage to counter a reversal of the reactor coolant flow. In a boiling water reactor having a steam-filled dome above the core, recirculated coolant water may pass downwardly through the annular space and upwardly through the core.

Preferably the reactor vessel houses a fluid-tight inner vessel, or pot, with a transverse partition through which projects the baffle surrounding the core and in which are mounted the non-return valves, the arrangement being such that flow of reactor coolant through the pot and the core is permitted in one direction but that a reversal of this flow is prevented.

One construction of reactor embodying the invention will now be described, by way of example, with reference to the accompanying drawing which shows a sectional view of a boiling water reactor.

*General assembly*

The reactor now to be described by way of example has a core 11 in which fuel elements are housed in fuel tubes 12 through which pressurised light water is circulated as a primary coolant. The fuel tubes are clustered in a manner to be described hereinafter in a region defined by a baffle 13, this assembly being housed in a fluid-tight pot 14. A secondary coolant, also light water, is circulated downwardly into the pot 14 through the annular space between the baffle 13 and the reactor vessel 17. An outlet from the pot 14 is formed by the baffle 13 so that water leaving the pot flows upwardly through the core between the fuel tubes. A thermal shield 15, interposed between the baffle and the pot, has apertures 16 to permit downward flow of the secondary coolant. Neutron moderation in the reactor is effected by the primary and secondary coolants.

The reactor is housed in a reactor vessel 17 closed by a dome 18 from which projects a steam pipe 19, three connections 21 for pressure relief valves, and three casings 22 (of which only one is shown in FIGURE 1) each housing a motor-driven pump 23 for circulating the primary coolant. Also projecting laterally of the dome are two outlets 24 for recirculating unevaporated secondary coolant, whilst projecting laterally of the vessel 17 are two inlets 25 for the recirculating secondary coolant. The pot sits within the lower half of the reactor vessel being located by a rim 26 surrounding the pot. An intermediate support annulus 7 is supported by the rim 26 and carries an intermediate support plate 27, whilst a top support annulus 8 rests on a shoulder formed at the upper end of the vessel and carries a top support plate 28. The intermediate support annulus and plate form a transverse partition which seals the pot 14, a sealing ring 9 being provided for this purpose. Between the support plates a skirt 29 defines a cylindrical heat transfer region 31 within which are clustered extension tubes 32, each extension tube being a continuation of a fuel tube. The upper ends of the extension tubes and the lower ends of the fuel tubes have interconnections to form parallel paths of serpentine configuration for the primary coolant through series of tubes. The fuel tubes and the extension tubes are suspended from the top support plate and are steadied against vibration and deformation by the intermediate support plate.

Apertures in the support plates permit upward flow of the secondary coolant through the core and the heat transfer region into the dome. In its upward passage the secondary coolant is allowed to boil to form a mixture of steam and water which is separated in the dome by fifteen cyclone steam separators 33 carried by the top support plate which discharge water to the outlets 24 and steam to scrubber units 34 and thence to the steam outlet. A division plate 20, in section similar to a top hat, covers the heat transfer region and funnels the secondary coolant through apertures 10 to the steam separators; the primary circulating pumps are mounted on the division plate.

The primary coolant is collected from and introduced into the paths through the fuel and extension tubes by ring headers 30, 35. The pumps 23 circulate the primary coolant from the upper outlet header 35 to the lower inlet header 30 and thence back to the fuel and extension tubes. A toroidal pressuriser 37 in communication with the lower header serves to maintain the pressure of the primary coolant and is situated within the annular space 38 between the skirt and the reactor vessel.

Hollow open-ended control rods 39 of neutron absorbing material are housed within the heat transfer region during normal operation of the reactor and drop into the core over guide tubes 42 when it is desired to shut the reactor down. The control rods are hydraulically operated, there being an individual connection 41 between each of nine central control rods (of which one is shown) and control apparatus outside the reactor by which these central control rods can be actuated singly or in groups. There are also connections 40 between other outer control rods (not shown) and an operating fluid header 43 within the division plate, and a single connection between this header and the control apparatus, so that the outer control rods are actuated in unison.

The recirculated water of the secondary coolant, together with feed water as necessary, is returned to the reactor vessel by the inlets 25 which open into the annular space 38 above the intermediate support annulus 7. Mounted in the intermediate support annulus are about twenty-four non-return valves 44 through which the secondary coolant must pass to enter the core pot. These valves have an important safety function.

It is desirable that a reactor fails safe in the event of any conceivable accident. Accordingly care must be taken to ensure that damage to the secondary coolant circuit could not result in the reactor vessel being drained of secondary coolant leaving the fuel tubes dry externally with the risk of over-heating. Should a rupture of the dome occur, the secondary coolant is depressurised and consequently much of this coolant is evaporated; however, it can be shown that sufficient coolant water remains in the core pot to maintain immersion of the greater part of the fuel tubes. On the other hand, should a rupture occur at the inlets 25 it is conceivable that, in the absence of the valves 44, the pressure of steam in the dome could force all the secondary coolant water in the core pot out through the rupture, leaving the fuel tubes dry externally. This possibility is forestalled by the non-return valves 44 which prevent secondary coolant being forced back from the core pot and expelled through the breach.

What we claim is:

1. A nuclear reactor comprising a reactor vessel, a reactor core within the reactor vessel, a coolant flowpath through the core for passage of a liquid reactor coolant, a fluid-tight inner vessel surrounding the reactor core within the reactor vessel, an outlet from the inner vessel constituted by the coolant flow path through the core, inlets to the inner vessel, and non-return valves at the inlets to ensure that coolant leaves the inner vessel through the core.

2. A nuclear reactor comprising a reactor vessel, a core within the reactor vessel, a cylindrical baffle surrounding the core and defining a flow path for a liquid reactor coolant to flow downwards through the annular passage between the baffle and the reactor vessel and upwards through the core, a fluid-tight inner vessel surrounding the core within the reactor vessel into which the lower portion of the baffle projects so as to define an outlet from the inner vessel, an inlet into the inner vessel which inlet is disposed in the annular passage, and a non-return valve at the inlet to counter flow of reactor coolant out of the inner vessel through the inlet.

3. A boiling water nuclear reactor comprising a reactor vessel, a core within the reactor vessel, a cylindrical baffle surrounding the core and defining a flow path for a water coolant to flow downwards through the annular passage between the baffle and the reactor vessel and upwards through the core, a steam dome above the core to collect steam generated in the coolant in its passage through the core, a fluid-tight inner vessel surrounding the core within the reactor vessel into which the lower portion of the baffle projects so as to define an outlet from the inner vessel, inlets into the inner vessel which are disposed in the annular passage, and non-return valves at the inlets to counter flow of reactor coolant out of the inner vessel through the inlet.

References Cited by the Examiner
UNITED STATES PATENTS

| | | | |
|---|---|---|---|
| 522,238 | 7/94 | Shearer | 122—507 |
| 1,105,397 | 7/14 | Bowers | 122—507 |
| 2,852,456 | 9/58 | Wade | 176—18 |
| 2,926,127 | 2/60 | McCorkle | 176—63 |
| 2,999,059 | 9/61 | Treshow | 176—42 |

CARL D. QUARFORTH, Primary *Examiner.*

REUBEN EPSTEIN, *Examiner.*